(12) United States Patent
Krüger et al.

(10) Patent No.: US 10,502,186 B2
(45) Date of Patent: Dec. 10, 2019

(54) METHODS AND APPARATUS FOR CONTROLLING WIND TURBINES

(71) Applicant: VESTAS WIND SYSTEMS A/S, Aarhus N (DK)

(72) Inventors: Thomas Krüger, Tilst (DK); Martin Atzler, Aarhus N (DK); Poul Brandt Christensen, Ry (DK); Robert Bowyer, London (GB)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 483 days.

(21) Appl. No.: 15/027,902

(22) PCT Filed: Oct. 6, 2014

(86) PCT No.: PCT/DK2014/050317
§ 371 (c)(1),
(2) Date: Apr. 7, 2016

(87) PCT Pub. No.: WO2015/051801
PCT Pub. Date: Apr. 16, 2015

(65) Prior Publication Data
US 2016/0252075 A1    Sep. 1, 2016

(30) Foreign Application Priority Data
Oct. 7, 2013 (DK) .......................... PA 2013 70558

(51) Int. Cl.
*F03D 7/02* (2006.01)
*F03D 17/00* (2016.01)
*F03D 1/00* (2006.01)

(52) U.S. Cl.
CPC ............. *F03D 7/0292* (2013.01); *F03D 1/00* (2013.01); *F03D 7/0224* (2013.01); *F03D 17/00* (2016.05);
(Continued)

(58) Field of Classification Search
CPC ...... F03D 7/0224; F03D 7/0292; F03D 17/00; F03D 1/00; F03D 7/042; F03D 7/0288;
(Continued)

(56) References Cited

U.S. PATENT DOCUMENTS 7,942,634 B2 *   5/2011   Christensen .......... F03D 7/0224
416/1
2002/0000723 A1   1/2002   Weitkamp
(Continued)

FOREIGN PATENT DOCUMENTS

EP   1674724 A2 *   6/2006   ............. F03D 7/042
EP   1911968 A1     4/2008
(Continued)

OTHER PUBLICATIONS

Hammerum K et al: "A fatigue approach to wind turbine control", Journal of Physics: Conference Series, Institute of Physics Publishing, Bristol, GB, vol. 75, Jan. 1, 2007, pp. 1-11.
(Continued)

*Primary Examiner* — Ninh H. Nguyen
*Assistant Examiner* — Jesse M Prager
(74) *Attorney, Agent, or Firm* — Patterson + Sheridan, LLP (57) ABSTRACT

Methods and systems for controlling a wind turbine in a manner that takes into account the degree of loading of and damage to one or more components of the turbine are provided. An operational load on a wind turbine part is determined, and is used to compute a damage signal. The damage signal is indicative of the potential damage to the component or to the turbine as a whole that will result if action is not taken to reduce or mitigate the determined load. When the damage signal exceeds a pre-determined threshold, load-reducing wind turbine control means are activated to obviate the estimated damage.

12 Claims, 6 Drawing Sheets

(52) U.S. Cl.
CPC ....... *F05B 2270/332* (2013.01); *Y02E 10/723* (2013.01)

(58) Field of Classification Search
CPC .............. F03D 7/0232; F05B 2270/332; F05B 2270/331; F05D 2260/94; F05D 2260/941
See application file for complete search history.

(56) References Cited

U.S. PATENT DOCUMENTS

| | | |
|---|---|---|
| 2003/0127862 A1 | 7/2003 | Weitkamp |
| 2004/0057828 A1* | 3/2004 | Bosche ................. F03D 7/0204 416/1 |
| 2007/0057517 A1 | 3/2007 | McNerney |
| 2009/0180875 A1* | 7/2009 | Egedal ................. F03D 7/0292 416/43 |
| 2010/0004878 A1* | 1/2010 | Volanthen ............... F03D 1/065 702/42 |
| 2011/0123331 A1* | 5/2011 | Stiesdal ................ F03D 7/0292 416/1 |
| 2011/0178771 A1* | 7/2011 | Miranda ............... F03D 7/0224 702/182 |
| 2014/0088888 A1* | 3/2014 | Poon ....................... F03B 15/00 702/34 |

FOREIGN PATENT DOCUMENTS

| | | |
|---|---|---|
| EP | 2108830 A2 | 10/2009 |
| EP | 2239462 A1 | 10/2010 |
| EP | 2615303 A1 | 7/2013 |
| WO | 2011/157272 A2 | 12/2011 |
| WO | 2013044925 A1 | 4/2013 |

OTHER PUBLICATIONS

International Search Report for PCT/DK2014/050317, dated Nov. 26, 2014.
Danish Search Report for PA 2013 70558, dated Sep. 11, 2014.

* cited by examiner

METHODS AND APPARATUS FOR CONTROLLING WIND TURBINES

The present invention relates to the control of wind turbines and, in particular, to methods and apparatus for reducing the loads sustained by various wind turbine components. The invention also relates to a controller for a wind turbine and to a wind turbine comprising such a controller.

Commercial wind turbines are typically designed to operate for a maximum lifetime of around 20 years. During that lifetime, a turbine may be subjected to a variety of wind conditions, which it must be able to withstand. On the one hand, a primary design consideration must always be the general desire to optimise efficiency by configuring a turbine to be capable of maximising power extraction from the wind at any one time and in any given environment. Of increasing concern, however, are on the other hand the manifold loads that various turbine components may sustain, especially when operating in more turbulent conditions. The resulting fatigue induced on the turbine parts may at times be such that it is advantageous to take steps to protect those parts at the expense of the instantaneous turbine power generation. This is especially so in the case of very large turbines, the height and rotor diameter of which give rise to considerable gravitational loading as well as to complex aerodynamic interactions with the incoming wind field. Some loads, such as the gravitational force acting on the structure as a whole, are constant in time; others exhibit cyclic variations, peaking one or more times during a single revolution of the rotor, while others still may be erratic and unpredictable in character.

Passive techniques that exploit the design and aerodynamic properties of individual rotor blades to control wind turbine power output or for the purpose of load reduction or mitigation are known. However, active control methods such as yaw control and blade pitch control, in which the operating configuration of a turbine is adjusted in response to one or more inputs, are increasingly preferred. Active control algorithms, that take account of the double-faceted nature of wind turbine design and aim to strike a balance between the two principal influencing considerations described above, are known in the art.

As an example, the methods disclosed in WO 2009/026930 involve selecting the best possible combination of pre-defined control strategies based on measured or estimated operational values of a wind turbine. For instance, when conditions are such that the level of fatigue experienced by the turbine is low, a common pitch angle that is calculated to maximise power generation may be applied equally to all rotor blades. Conversely, when one or more sensed operational values are above corresponding threshold levels, the wind turbine controller may additionally activate individual or collective (cyclic) pitching regimes in order to anticipate and/or to reduce the associated fatigue loads on each blade or, more generally, on the global turbine structure.

The trade-off situation described above is complicated still further, however, when account is taken not only of a turbine's load-bearing parts, but also of the adjustment mechanisms themselves, mobilised by control activation algorithms and responsible for realising the desired control strategy or strategies. The physical components, such as the bearings involved in adjusting the pitch of the rotor blades, are in turn subject to wear through use, such that their frequent or constant engagement can result in the need for replacement before the end of the lifespan of the turbine as a whole. While such continued or aggressive control may be justified and indeed necessary where a turbine site is characterised by particularly harsh conditions, in many cases this is not so; the deterioration of the adjustment mechanisms then becomes needless and can result in unwarranted maintenance, and ultimately replacement, of these parts, often accompanied by considerable expenditure.

We have appreciated that it would be desirable to provide improved control activation strategies for wind turbines, by means of which a better balance may be struck between the desire to reduce loading and the need to minimise the wear of control actuation mechanisms.

SUMMARY OF THE INVENTION

The invention is defined in the independent claims to which reference is now directed. Advantageous features are set forth in dependent claims.

According to the present invention there is provided, in a first aspect, a method for controlling a wind turbine comprising the steps of determining an operational load on one or more wind turbine components; determining, based on the load, a damage signal that is indicative of the potential damage to the component(s); and applying a chosen load-reducing control strategy to the wind turbine whenever the damage signal exceeds a pre-defined threshold level in order to mitigate the foreseen damage.

Determining the operational load may comprise using one or more blade load sensors mounted on the turbine to measure the flapwise or edgewise bending of at least one rotor blade of the wind turbine. Furthermore, this aspect may further comprise the steps of determining that one or more control means are active when the flapwise or edgewise bending of the rotor blade is measured and correcting a signal representative of the measured flapwise or edgewise bending to obtain an estimate of the flapwise or edgewise bending that would have been measured had the control means not been so active, i.e. had the control means not been operative.

Determining the operational load may comprise estimating at least one of a tilt moment on a rotor of the wind turbine and a yaw moment on the rotor of the wind turbine.

In embodiments, the damage signal may be a function of the determined operational load and a mechanical property of the wind turbine component. The mechanical property may corresponds to a non-linear fatigue property. The mechanical property may optionally be the Wöhler exponent for the wind turbine component.

In embodiments, the damage signal may be representative of the determined operational load. The damage signal may also include an estimate of the fatigue life consumed by the component.

The control strategy may comprise the step of controlling a pitch angle of at least one rotor blade of the wind turbine.

The method may also comprise the step of modifying a reference value for the control strategy in accordance with the determined operational load.

In a second aspect, the invention provides a control system for a wind turbine, the control system comprising a sensor for measuring a load on a wind turbine component and a controller for determining a damage signal based on the load and, wherein when the damage signal exceeds a pre-determined threshold level, the controller is operable to apply a control strategy to the wind turbine to mitigate potential damage to the component.

A further aspect of the invention provides a computer readable storage medium comprising instructions for carrying out the method of any of first or second aspects. In general the various aspects of the invention may be combined and coupled in any way possible within the scope of the invention.

Embodiments of the invention have the advantage that a control measure for reducing a given load may be activated based on the predicted effects of the load on one or more specific components. By relating the decision to implement load-attenuating control directly to the degree of damage that a load may cause, a more calculated and farsighted approach to control activation may be realised. Consequently, unnecessary wear of control actuation mechanisms may be lessened, resulting in a reduction in undue, inevitably costly, maintenance.

The term 'operational load' refers to any load experienced by any part of the wind turbine during operation. In some embodiments the load may a bending moment on one or more rotor blades, which is measured directly by known sensors situated on the turbine. Preferably, where control measures are in place at the time of load measurement, the resulting signals are corrected to obtain an estimate of the 'raw' loads that would have been measured had the control not been operative. In other embodiments, the load may be derived from these direct or corrected measurements. Examples are the tilt moment and the yaw moment on the wind turbine rotor. The load-reducing control strategy may be any of the various load mitigation measures currently known in the art including, but not limited to, methods for adjusting the pitch of the rotor blades.

The damage signal may be any measure of the damage or fatigue that a wind turbine component is sustaining or will sustain as a result of the determined load. In preferred embodiments of the invention, the measured or derived load may be used in the calculation of a damage signal that takes into account the mechanical properties of the component in question. In that case, the degree to which the damage signal reflects the wear of the loaded component or components to which it corresponds may be increased, such that the selectivity of methods according to these embodiments may advantageously be improved. Since comparatively smaller loads may lead to the activation of the appropriate control strategies, components that are more susceptible to damage can be prioritised. In an embodiment, the damage signal depends on the non-linear fatigue properties of the loaded wind turbine component. This may be implemented, for example, in a damage signal that is a function of the Wöhler exponent of the component. In other embodiments, signals representative of the established load itself may constitute an adequate reflection of the damage that the load brings about. In addition, lifetime usage estimators such as those described in WO 2013/044925 may be used to give a further reference signal that is an indication of the fatigue life already consumed by any wind turbine component or components of interest, i.e., of the accumulated damage already undergone. This may further improve the balance between the loading of the turbine components and the wear of control actuation mechanisms.

In some embodiments, measured loads may be used to modify not only the activation of a given control algorithm, but also one or more parameters used within the running of that algorithm. As an example, common control algorithms work by comparing one or more measured loads to corresponding reference values and adjusting the operating setpoints of the turbine in such a way as to reduce the loads towards these desired values. Currently, reference values are typically set either to zero or to a more or less arbitrary non-zero value. Increasing the reference away from zero has the advantage that the amount by which a load is to be decreased is effectively reduced, such that the degree of control action taken is ultimately regulated. As discussed in more detail below, methods according to the present invention may derive a non-zero reference value for a control algorithm from the current loads on one or more wind turbine components. The reference value so determined may advantageously be less arbitrary than those used in existing methods and may furthermore be varied over time in such a way as to mirror the loading experienced by the turbine.

The invention further resides in a wind turbine controller configured to carry out the steps of the method described above, as well as in a wind turbine comprising such a controller.

BRIEF DESCRIPTION OF THE DRAWINGS

Embodiments of the invention will now be described, by way of example only, with reference to the accompanying drawings, in which.

DETAILED DESCRIPTION OF PREFERRED EMBODIMENTS

The present invention provides a systematic approach to developing activation algorithms for active wind turbine control measures. Embodiments of the invention are characterised by the provision of a damage estimate that is indicative of the damage caused to a wind turbine component by one or more operational loads on that component, and by the use of this signal in a decision concerning the degree to which load-reducing control methods are applied during the operation of the turbine. As will become apparent from the discussion below, the way in which the damage estimate is calculated will vary, and will depend on the specific load and wind turbine component in question. In the following, several examples will be given and described in detail in the context of existing blade pitch control strategies that are used to alleviate fatigue loads on the wind turbine rotor blades and on the bearing that supports the turbine main shaft. It will be understood, however that the specific damage estimation steps recited in each case are given for the purposes of illustration alone, and may in alternative embodiments be substituted by any suitable indication of damage or wear. In embodiments other than those considered below, similar or different damage estimates may be formulated as appropriate.

Furthermore, the invention is limited neither to use in the context of the particular fatigue loads discussed, nor to the use of blade pitching as a means for lessening those loads. The embodiments described have the advantage that blade pitch bearings may be activated only when such action is considered warranted, such that unnecessary wear and depreciation of these mechanisms may be minimised. However, the principles underlying the methods set forth find equal application, for example, in the modification of yaw control strategies that are designed to preserve the orientation of the rotor with respect to the incoming wind. Moreover, each of the algorithms described below provides fast enablement of the corresponding control means, such that the invention is not limited to the consideration of long-term fatigue loads on the various wind turbine parts but, rather, may advantageously be adapted in a straightforward manner to mitigate the damage caused by sudden or extreme loads such as extreme gusts or extreme wind shear.

Figure 1:
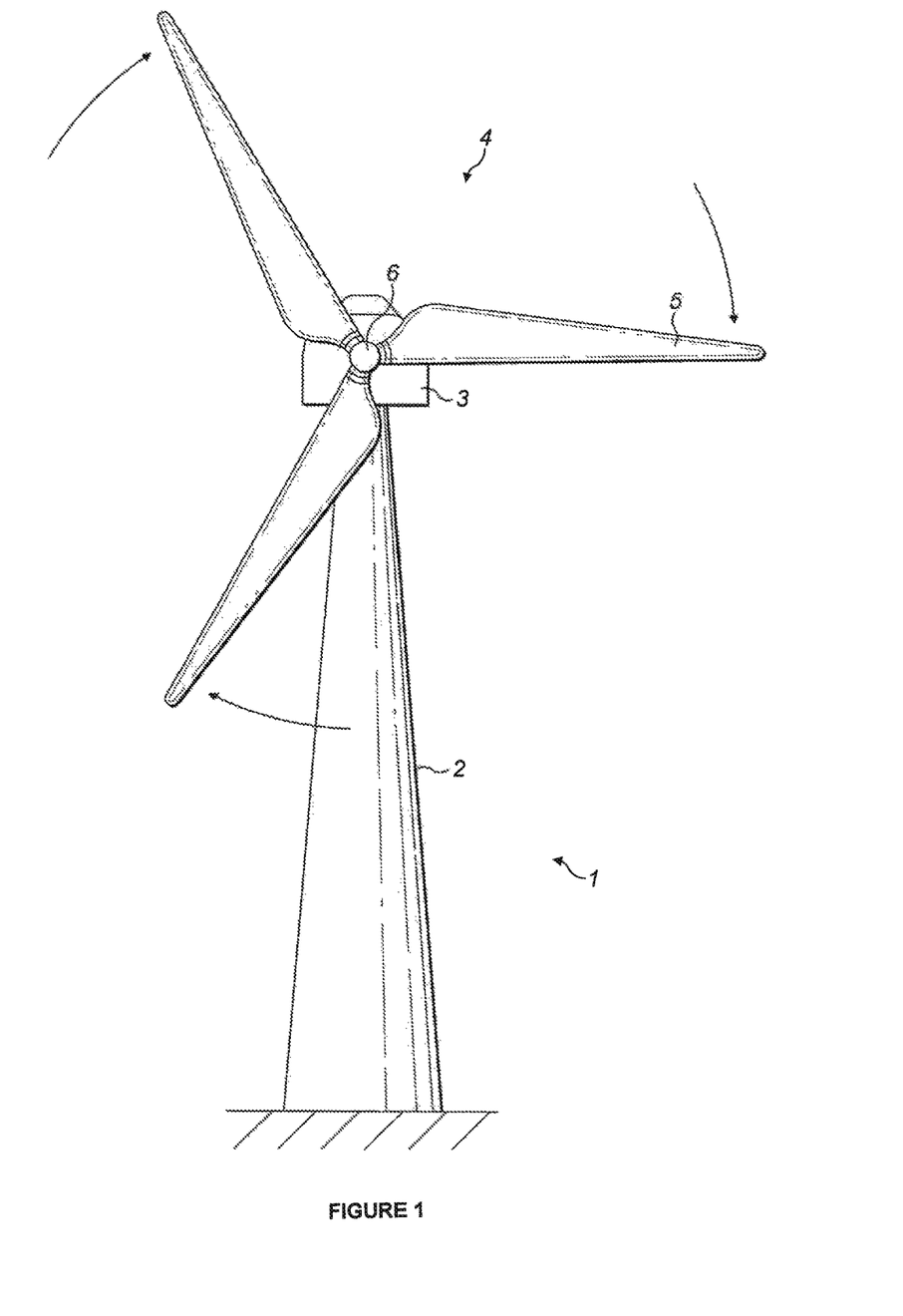
FIG. 1 is a schematic illustration of a typical horizontal axis wind turbine.

FIG. 1 illustrates a typical horizontal axis wind turbine 1. The turbine comprises a tower 2 and a nacelle 3 positioned atop the tower. As discussed in more detail below, the nacelle houses the principal power generation components of the wind turbine, commonly referred to as the drive train. A wind turbine rotor 4 comprising a plurality of rotor blades 5 is mounted on a hub 6. The hub is connected to the drive train via a low-speed shaft (not shown), also referred to as the main shaft, that passes through the front of nacelle 3. The wind turbine shown in FIG. 1 may be a large commercial machine that is connected to a power grid and used for large-scale generation of electricity. In that case, the tower 2 may be up to 100 m or more in height; each rotor blade 5 may be 50 m or more in length; and the turbine may have the capacity to generate in excess of 2 MW of power, even 5 MW or more. While turbine 1 is depicted as having three rotor blades, other domestic and commercial wind turbine rotors may comprise two, three or, alternatively, four or more blades.

Figure 2:
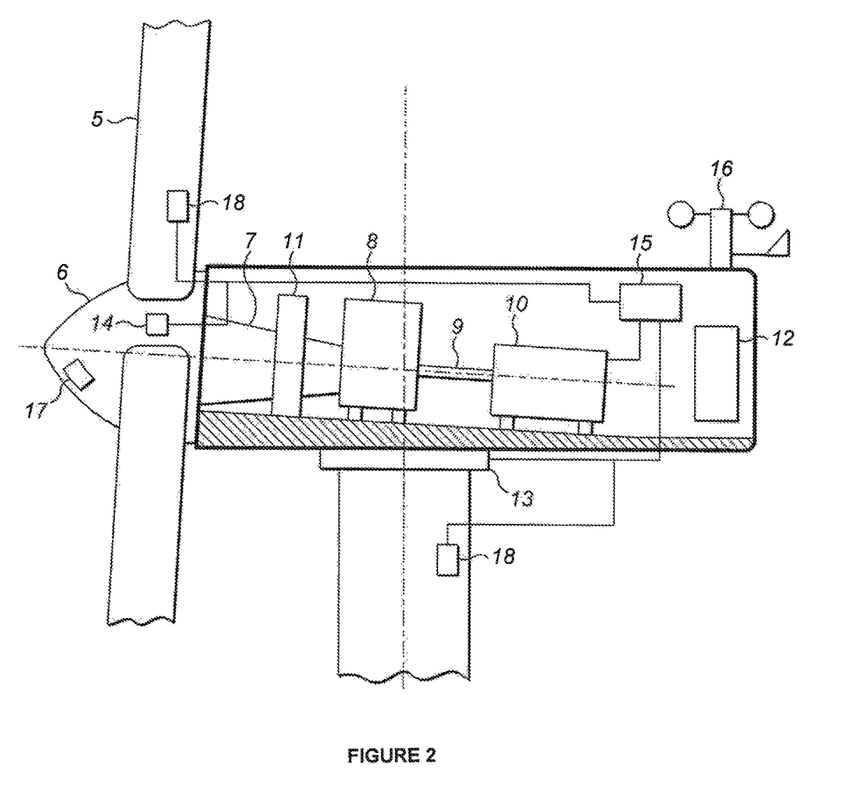
FIG. 2 is a schematic illustration of a typical wind turbine controller.

FIG. 2 is a schematic view illustrating the interior of nacelle 3. The low-speed shaft, shown as 7, is supported by a main bearing 11 and connected to a gear box 8. A secondary shaft 9 extends from the gear box and into generator 10. In operation, incoming wind causes the rotor blades 5 to rotate and to drive the main shaft, introducing mechanical energy that is converted by the generator into electrical energy suitable for output. The nacelle also comprises a power converter/transformer 12, as well as ancillary apparatus such as control devices, sensors, heating and lighting units, hydraulic systems, cooling systems and so forth.

The nacelle is mounted on the wind turbine tower by means of a yaw drive 13, which may be used to adjust the azimuthal orientation of the nacelle with respect to the incident wind direction. One or more pitch actuators 14, such as pneumatic or electrical pitch control actuators, are also mounted in the hub 6 and engage with the root sections of the wind turbine blades 5 to control the angle of attack of the blades with respect to the incoming wind.

As shown in FIG. 2, the nacelle further comprises a controller 15 connected to the generator 10, to the yaw drive 13 and to the one or more pitch actuators 14 by suitable control lines. The controller may also be connected to one or more sensor devices such as an anemometer and/or wind vane 16, which may be used to determine wind speed and/or wind direction at the turbine. An optional ranged wind speed measurement device such as a LIDAR, RADAR or SONAR device 17 may also be housed in the hub 6 or on the nacelle itself, and used to detect the wind speed and wind conditions upwind of the turbine. Finally, loads on the rotor blades 5 and on the wind turbine tower, for example, may be determined using one or more load sensors 18 situated on those components. Appropriate load signals may then be passed, via suitable control lines, to the controller. Additional sensors may detect other conditions affecting the wind turbine rotor and rotor blades, such as temperature, air turbulence and vibration, for example.

In practice, the controller 15 is implemented as a dedicated processor with access to control algorithms embodied in software or hardware. The processor receives inputs from the various sensors and outputs control signals on suitable control lines or on a data bus. Specifically, the controller receives control signals indicative at least of the measured or estimated wind conditions at the wind turbine, and sets reference control signals to adjust operating parameters of the turbine such as the operating conditions of the generator, the pitch angle or angles of the rotor blades and the yaw angle of the rotor.

Figure 3:
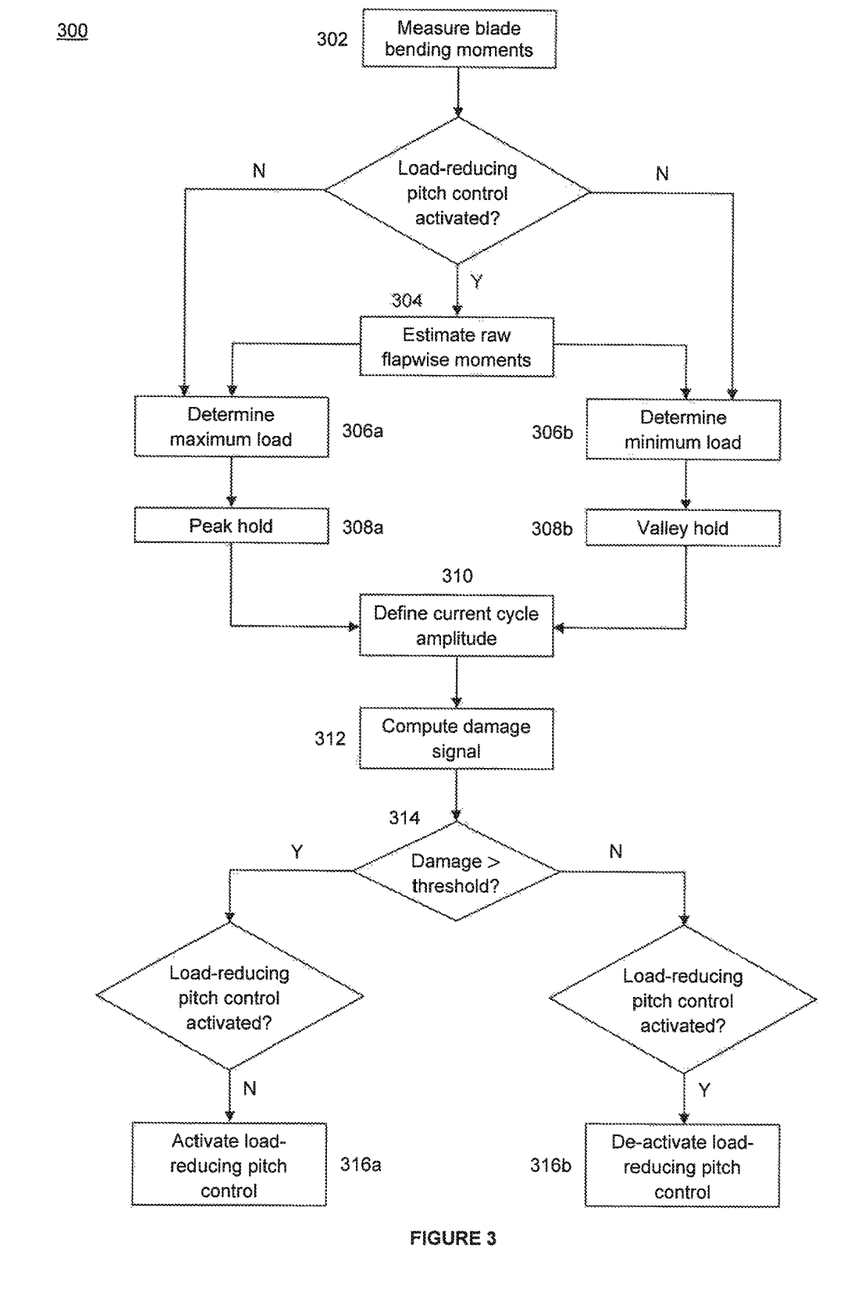
FIG. 3 is a flowchart illustrating a first embodiment of the present invention.

A flowchart illustrating one example 300 of a method according to the present invention is shown in FIG. 3.

As mentioned above, it is known to measure the loading on a rotor blade, in particular the flapwise and edgewise moments that act to bend the blade, using sensors mounted on the blade. In current pitch control strategies, these load measurements are used to provide an input to a controller, which calculates the amount by which the pitch of each blade needs to be adjusted to reduce the loading to a reference or desired value, which may be either zero or a chosen non-zero value. In the example of FIG. 3, fluctuations in the measured bending moments are monitored and used to calculate a damage signal that is indicative of the damage or fatigue that the blades may sustain as a result of those load variations. An active decision as to whether or not to implement a load-reducing pitch control strategy can then be taken based on this signal. In particular, a periodic variation is added to the pitch angle of each blade whenever the flapwise loading exhibits cyclic changes of sufficiently large amplitude.

Turning to FIG. 3, the instantaneous flapwise moment on each rotor blade is measured at step 302.

An input that is a true indication of the loading that operating conditions would inflict on a turbine unassisted by control means is important for the proper functioning of a load-dependent activation scheme such as those of the present invention. In the example depicted in FIG. 3, a blade may be individually pitched, say to angle D, at the time at which the blade loads are sensed at step 302. For example, the blade pitch may have been adjusted during a previous iteration of the method. If this is so, some or all of the bending that would otherwise have loaded the blade will have been removed or mitigated by the applied pitch adjustment, such that the signal output by the blade load sensors will not be a true reflection of the raw loads that would have been measured in the absence of any control. Thus, where a damage signal based on the actual loading of the turbine by the wind would have triggered the activation of control measures as mentioned above and described in further detail below, that calculated using the direct output of the blade load sensors may not do so. Here, therefore, each measured load $M_{flap}^i$ (where the index i=1, 2, 3 labels the individual rotor blades) is supplemented at step 304 with a simple linear correction to account for the load reduction stemming from existing pitching of the blades to obtain an estimate $M_{flap,est}^i$ of the raw bending moment that would load a blade at collective pitch $\vartheta_{coll}$, i.e., with individual pitching turned off:

$$M_{flap,est}^i = M_{flap}^i + \frac{\partial M_{flap}}{\partial \vartheta} \cdot (\vartheta - \vartheta_{coll}), \tag{1}$$

where $$\frac{\partial M_{flap}}{\partial \vartheta}$$

is the flapwise sensitivity of the rotor blades with respect to blade pitch angle. In other embodiments, in particular where control other than blade pitching is already operative when loads are measured, alternative or additional suitable corrections could be formulated and applied as required.

At step 306a, the maximum $M_{flap,max}$ of the three blade load signals is determined before being passed, at step 308a, to a peak hold filter. Similarly, the minimum $M_{flap,min}$ of the measured moments is determined at step 306b and fed through a valley hold filter at step 308b. The peak and valley hold filters store, respectively, the largest load $M_{flap,peak}$ and the smallest load $M_{flap,valley}$ measured on any one blade. The amplitude of the variations in the flapwise bending may then be calculated and used to determine a damage signal, as discussed below.

To implement the peak hold and the valley hold, asymmetric filters are used. These have the advantage that they have no delay for rising damage signals, but realise an averaging effect if the damage is decreasing. Thus, they provide both fast enabling and slow fading out.

At step 310, the amplitude $M_{flap,cycle}$ of the variations in flapwise loading is determined. In the present example, this is defined to be the greater of the difference between the maximum of the three blade load signals and the held valley and that between the held peak and the minimum blade load:

$$M_{flap,cycle} = \text{Max}\{M_{flap,max} - M_{flap,valley}, M_{flap,peak} - M_{flap,min}\} \quad (2).$$

Figure 4A:
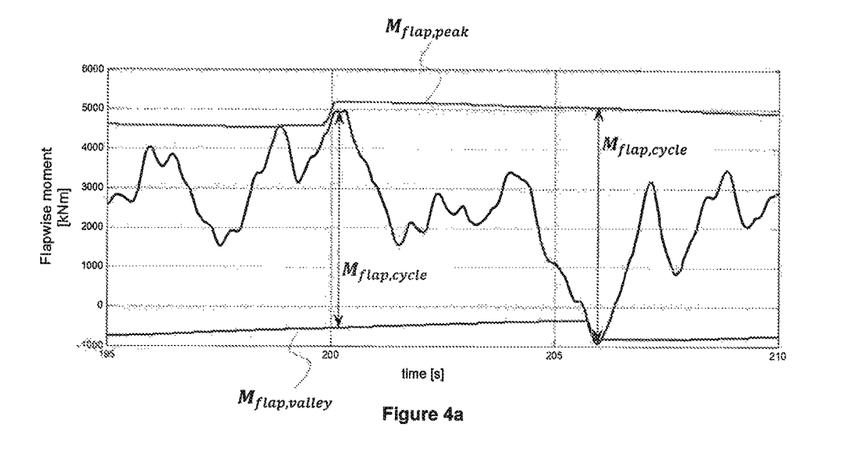
FIG. 4 shows the results of a simulation of the method of FIG. 2.

The operation of the method of the present embodiment is illustrated in FIG. 4, which shows the results of a simulation of the algorithm. The calculation of $M_{flap,cycle}$ is shown in FIG. 4a. The amplitude at around time 200 s is equal to the difference between the blade load and the held valley at that time, approximately 5,500 kNm. Conversely, at time 206 s the amplitude is defined as the deviation of the measured load of around −900 kNm from the held peak of 5000 kNm.

Figure 4B:
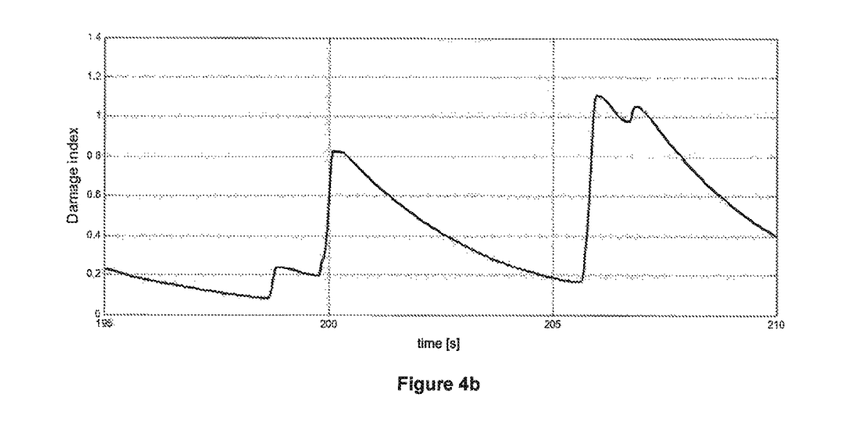

At step 312 the amplitude of equation (2), once suitably normalised, is raised to a power that corresponds to the Wöhler exponent for the blade material to give a damage index $M_{flap}$. Thus $$M_{flap} = \left(\frac{M_{flap,cycle}}{M_{flap,rtd}}\right)^m, \quad (3)$$

where m is the Wöhler coefficient representing the nonlinear fatigue properties of the material and $M_{flap,rtd}$ is the rated flapwise bending of the rotor blades. In an embodiment, the Wöhler exponent is not used, this may be implemented by setting m=1 in equation (3). The evolution of $M_{flap}$ over time in the case of the present example is shown in FIG. 4b.

Finally, at step 314 the damage index is compared to a pre-determined threshold in order to decide whether the flapwise moments should be passed to the pitch controller to realise any (further) adjustments in the blade pitch angles in the known manner. It is worth noting that the method of the present example may usefully be implemented in the activation of any preferred pitch control strategy.

As previously mentioned, the in-built dependence on the fatigue properties of the blade material means that the damage index described above is advantageously directly representative of the damage that the blades will undergo if action is not taken to reduce the flapwise bending imposed by the incoming wind. This may mean that preventive control steps can be taken to mitigate likely wear and fatigue before the blades are damaged in such a way as to necessitate repair or replacement. At the same time, a damage signal calculated as discussed above may constitute a more astute basis for the decision to activate load-reducing control than the mere detection or measurement of loads. This may in turn result in a more favourable trade-off between the need to protect the wind turbine blades and the desire to reduce the wear of the pitch actuation mechanisms and blade bearings that are engaged in the activation of pitch control. It is stressed, however, that any appropriate indication of damage could be used in place of that described. For example and as mentioned previously, lifetime usage estimators can be employed to derive an indication of the fatigue life already consumed by a particular component, in particular as compared to its design limit. Use of such estimates as input data is considered within the scope of the decision making algorithms of the present invention.

Figure 5:
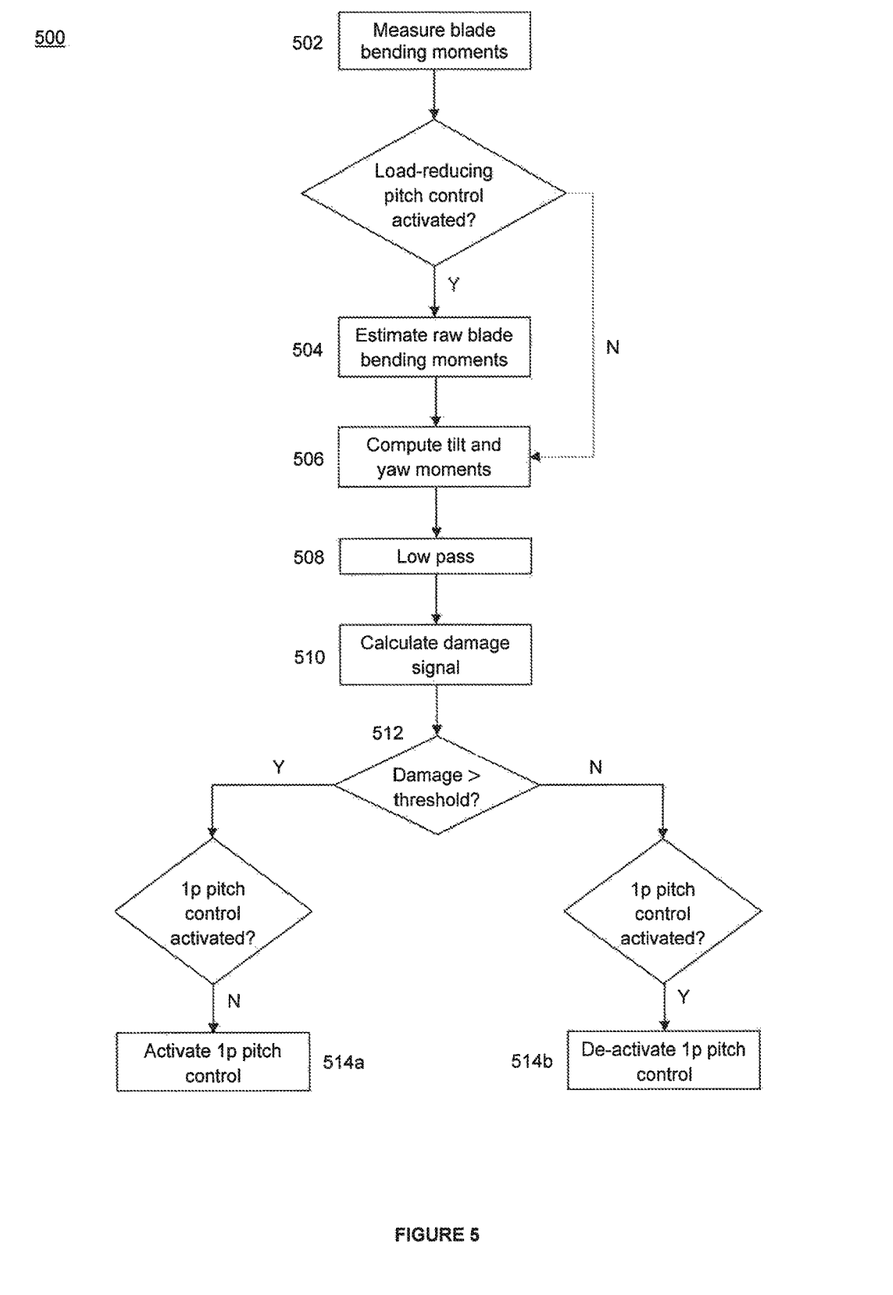
FIG. 5 is a flowchart illustrating a second embodiment of the present invention.

A second example 500 of a method according to the present invention is shown in the flowchart of FIG. 5.

The sizeable gravitational and aerodynamic forces that load the rotor of a wind turbine are commonly understood in terms of their manifestation as two principal loads on the turbine main bearing: the tilt rotor moment and the yaw rotor moment. These moments, in turn, are typically separated into their static and cyclic components. A number of factors, such as the gravitational loading of the rotor, may contribute to static moments at the main bearing. Periodic tilt and yaw moments may stem, for example, from fluctuating blade loads, in turn a consequence of local variations in the wind field.

Both the static and the cyclic loading of the main bearing may be compensated by means of existing pitch control algorithms. Specifically, static loads may be reduced by means of sinusoidal variations in the pitch of each rotor blade with frequency equal to that of the rotation of the rotor (so-called 1p pitch control), while periodic pitching with frequencies corresponding to higher harmonics can attenuate cyclic tilt and yaw moments. The method of FIG. 5 replaces the continued and automatic pitching of blades according to these cycles with a more selective activation strategy. In particular, implementation of the control is made conditional upon the magnitude of a damage signal computed from the tilt and yaw moments and indicative of the fatigue that the main bearing will endure as a result of these moments. While FIG. 5 is discussed below with reference to static loads, it will be apparent that the method is equally applicable to the pitching of the blades with higher frequencies in response to high periodic loading of the main bearing.

As is known in the art, estimates of the tilt and yaw moments can be derived from the bending moments that load the turbine blades. Specifically, the contribution to the tilt moment from blade i, $M_{tilt}^i$, is given by $$M_{tilt}^i = (M_{flap,H}^i \cos \theta^i + M_{edge,H}^i \sin \theta^i) \cos \varphi^i \quad (4),$$

where $M_{flap,H}^i$ and $M_{edge,H}^i$ are, respectively, the flapwise and edgewise moments on the blade, measured by blade load sensors and transformed to the frame of reference of the wind turbine hub; $\theta^i$ is the pitch angle of blade i; and $\varphi^i$ is the azimuthal position of blade i. Similarly, the yaw moment on the turbine main bearing that results from the bending moments on blade i is $$M_{yaw}^i = (M_{flap,H}^i \cos \theta^i + M_{edge,H}^i \sin \theta^i) \sin \varphi^i \quad (5).$$

Turning to FIG. 5, then, the algorithm labelled 500 begins with the detection of the flapwise and edgewise blade loading and, where necessary, with their correction as described above with reference to FIG. 3. (As will be apparent to the skilled reader, equation (1) is easily adapted to the case in which edgewise bending moments are to be corrected to obtain an estimate $M_{edge,est}^i$.) The tilt and yaw moments are computed at step 506, before being passed through a low pass filter (508) to remove the unwanted cyclic contributions and used at step 510 in the calculation of a damage signal, as explained in detail below. Lastly, following the comparison at step 512 of the damage signal to the threshold for activation, 1p blade pitching is applied if and as appropriate to reduce the corresponding loads.

In the example of FIG. 5, the calculation of the damage index is based on the resultant $M_{TY}$ of the tilt and yaw moment vectors $M_{tilt}$ and $M_{yaw}$, calculated as $$M_{TY} = \sqrt{M_{tilt}^2 + M_{yaw}^2} \qquad (6).$$

Specifically, the damage signal is defined to be simply the magnitude of $M_{TY}$, again suitably normalised, and possibly raised to the Wöhler exponent for the main bearing. The damage index calculated in this way is, however, only one example of a signal that could be used to represent the fatigue of the main bearing; alternatives are possible, and indeed envisaged. In some embodiments, for example, separate damage indices may be calculated solely from the tilt moment and from the yaw moment, respectively. In those examples, load-reducing control may be activated whenever either or both of the individual damage indices exceeds a corresponding threshold.

As mentioned above, furthermore, the method shown as 500 is readily applied to the use of pitch control to alleviate cyclic tilt and yaw moments with frequencies corresponding to integer multiples of the rotor frequency. Specifically, the low pass filter of step 508 would in those cases be replaced with the selection of higher frequencies as appropriate, with the final step being used to activate not 1p pitching, but pitching with a periodicity suitable for matching that of the loads. A third example application 600 of the present invention is shown in FIG. 6.

Figure 6:
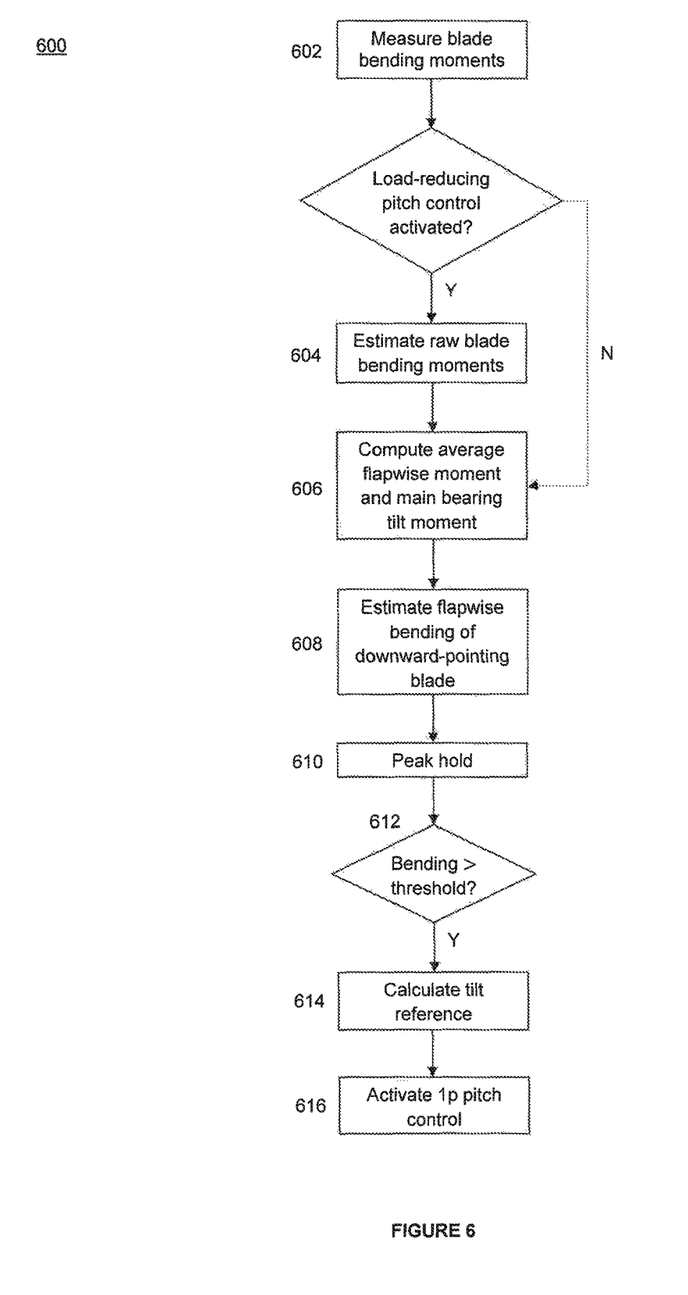
FIG. 6 is a flowchart illustrating a third embodiment of the present invention.

The embodiment of FIG. 6 is concerned with the use of blade pitching to counter high flapwise bending of the downward-pointing blade in particular, the goal being that of ensuring sufficient clearance as the blade passes the turbine tower.

As is known in the art, a tilt moment may be understood as a flapwise bending of two thirds its magnitude, and vice versa. With this in mind, at steps 602 to 606 measurements of the flapwise and edgewise bending of all three blades are first obtained, corrected if appropriate, and used to calculate the tilt moment on the turbine main bearing, $M_{tilt}$, as described previously. To obtain specifically the bending on the downward pointing blade, $M_{flap}^{down}$, the collective flapwise moment must also be added. Thus, at step 606 the average $(M_{flap})$ of the flapwise moments measured on each blade is determined, before $M_{flap}^{down}$ is estimated at step 608 according to $$M_{flap}^{down} = \frac{2}{3} M_{tilt} + \langle M_{flap} \rangle. \qquad (7)$$

The moment given by equation (7) is then passed through a peak hold filter at step 610, before being compared to a preset threshold $M_{flap,thr}$ (612). Where the load exceeds the threshold, the 1p pitch control algorithm is run to calculate and apply variations in blade pitch that will dampen the bending moment and increase the clearance as the blade passes the tower.

As mentioned previously, the present invention provides for the use of the measured loading of the turbine to provide one or more reference values for the control algorithms of interest. Thus, differently from the examples discussed above, in addition to providing a pitch control activation strategy the embodiment described with reference to FIG. 6 also implements this optional modification of the running itself of the control algorithm. More specifically, at step 612 the tilt moment reference $M_{tilt,ref}$ that is passed as input to the wind turbine blade pitch controller is set to $$M_{tilt,ref} = -\frac{3}{2}(M_{flap,down} - M_{flap,thr}). \qquad (8)$$

The tilt moment reference given by equation (8) advantageously depends on the amount by which the bending threshold $M_{flap,thr}$ is exceeded. Step 612 is not mandatory, however, and the method shown as 600 may equally be applied with a zero or other suitable reference value.

The functional blocks illustrated in FIGS. 3, 5 and 6 are intended to be schematic representations only. In practice, the individual functions may be carried out by one or more hardware or software modules implementing the necessary control algorithms to effect the intended result. The functionality of a single block may for example also be combined with that of another block to form a combination.

Example embodiments of the invention have been described for the purposes of illustration only, and not to limit the scope of the invention as defined in the following claims.

What is claimed is:
1. A method for controlling a wind turbine, comprising:
determining an actual loading of a wind turbine component of the wind turbine based on current wind conditions affecting the wind turbine component, wherein the wind turbine component is set to a first rotational path according to a first control strategy, wherein the first rotational path defines a first series of angles for the wind turbine component over a given rotation of wind turbine blades around a main bearing of the wind turbine, and wherein the first control strategy sets individual pitch controls for all of the wind turbine blades of the wind turbine;
calculating a corrected loading on the wind turbine component based on the current wind conditions and a second rotational path for the wind turbine component, wherein the second rotational path is set according to a second control strategy and defines a second series of angles, different than the first series of angles, for the wind turbine component over the given rotation of the wind turbine blades around the main bearing of the wind turbine, and wherein the second control strategy sets a collective pitch control for all of the wind turbine blades;
calculating a damage index for the wind turbine component based on the corrected loading; and
in response to determining that a pre-determined threshold exceeds the damage index, switching control of the wind turbine from the first control strategy to the second control strategy.

2. The method of claim 1, wherein determining the actual loading is based on an instantaneous measurement at a given time on the wind turbine component, when the wind turbine component is positioned at a first pitch angle of the wind turbine component, and wherein calculating the calculated loading is based on a difference between the first pitch angle and a second pitch angle of the wind turbine component based on a calculated position of the wind turbine component in the second rotational path at the given time.

3. The method of claim 1, wherein the damage index represents fatigue properties, comprising:
   blade bending; and
   blade fatigue.

4. The method of claim 1,
   wherein switching control of the wind turbine further comprises:
      deactivating the individual pitch controls and applying the collective pitch control.

5. A wind turbine, comprising:
   a nacelle;
   a plurality of wind turbine blades, rotatablely mounted to the nacelle by a main bearing; and
   a control system comprising a processor and a memory storage device including instructions that when executed by the processor enable the control system to:
      determine an actual loading of a wind turbine component of the wind turbine based on current wind conditions affecting the wind turbine component, wherein the wind turbine component is set to a first rotational path according to a first control strategy that sets individual pitch controls for all of the wind turbine blades of the wind turbine, wherein the first rotational path defines a first series of angles for the wind turbine component over a given rotation of the wind turbine blades around the main bearing of the wind turbine;
      calculate a corrected loading on the wind turbine component based on the current wind conditions and a second rotational path for the wind turbine component, wherein the second rotational path is set according to a second control strategy that sets a collective pitch control for all of the wind turbine blades and defines a second series of angles, different than the first series of angles, for the wind turbine component over the given rotation of the wind turbine blades around the main bearing of the wind turbine;
      calculate a damage index for the wind turbine component based on the corrected loading; and
      in response to determining that a pre-determined threshold exceeds the damage index, switch control of the wind turbine from the first control strategy to the second control strategy.

6. The wind turbine of claim 5, wherein determining the actual loading is based on an instantaneous measurement at a given time on the wind turbine component, when the wind turbine component is positioned at a first pitch angle of the wind turbine component, and wherein calculating the calculated loading is based on a difference between the first pitch angle and a second pitch angle of the wind turbine component based on a calculated position of the wind turbine component in the second rotational path at the given time.

7. The wind turbine of claim 5, wherein the damage index represents fatigue properties, comprising:
   blade bending; and
   blade fatigue.

8. The wind turbine of claim 5,
   wherein switching control of the wind turbine further comprises:
      switching control of the wind turbine from the first control strategy to the second control strategy to deactivate the individual pitch controls and apply the collective pitch control.

9. A computer-readable storage medium comprising instructions which, when executed by a processor performs an operation for controlling a wind turbine, the operation comprising:
   determining an actual loading of a wind turbine component of the wind turbine based on current wind conditions affecting the wind turbine component, wherein the wind turbine component is set to a first rotational path according to a first control strategy that sets individual pitch controls for all wind turbine blades of the wind turbine, wherein the first rotational path defines a first series of angles for the wind turbine component over a given rotation of wind turbine blades around a main bearing of the wind turbine;
   calculating a corrected loading on the wind turbine component based on the current wind conditions and a second rotational path for the wind turbine component, wherein the second rotational path is set according to a second control strategy that sets a collective pitch control for all of the wind turbine blades and defines a second series of angles, different than the first series of angles, for the wind turbine component over the given rotation of the wind turbine blades around the main bearing of the wind turbine;
   calculating a damage index for the wind turbine component based on the corrected loading; and
   in response to determining that a pre-determined threshold exceeds the damage index, switching control of the wind turbine from the first control strategy to the second control strategy.

10. The computer-readable storage medium of claim 9, wherein determining the actual loading is based on an instantaneous measurement at a given time on the wind turbine component, when the wind turbine component is positioned at a first pitch angle of the wind turbine component, and wherein calculating the calculated loading is based on a difference between the first pitch angle and a second pitch angle of the wind turbine component based on a calculated position of the wind turbine component in the second rotational path at the given time.

11. The computer-readable storage medium of claim 9, wherein the damage index represents fatigue properties, comprising:
   blade bending; and
   blade fatigue.

12. The computer-readable storage medium of claim 9, wherein switching control of the wind turbine further comprises:
   deactivating the individual pitch controls and applying the collective pitch control.

* * * * *